United States Patent [19]

Yoshizumi et al.

[11] Patent Number: 4,700,284
[45] Date of Patent: Oct. 13, 1987

[54] HIGH-VOLTAGE THYRISTOR CONVERTER AND LASER WITH MIRROR CONTROL THEREFOR

[75] Inventors: Toshiaki Yoshizumi; Akiyoshi Yoshioka, both of Hyogo, Japan

[73] Assignee: Mitsubishi Denki Kabushiki Kaisha, Tokyo, Japan

[21] Appl. No.: 4,286

[22] Filed: Jan. 6, 1987

Related U.S. Application Data

[62] Division of Ser. No. 663,402, Oct. 22, 1984, abandoned.

[30] Foreign Application Priority Data

Dec. 5, 1983 [JP] Japan ............................. 58-228523
Dec. 5, 1983 [JP] Japan ............................. 58-228524
Dec. 5, 1983 [JP] Japan ............................. 58-228525

[51] Int. Cl.$^4$ ............................................. H02M 1/08
[52] U.S. Cl. ...................................... 363/68; 307/641; 307/645
[58] Field of Search ............... 363/35, 50, 54, 68; 307/252 L, 252 Q, 252 R, 252 A

[56] References Cited

U.S. PATENT DOCUMENTS

| | | | |
|---|---|---|---|
| 3,355,600 | 11/1967 | Mapham | 307/252 L |
| 3,723,768 | 3/1973 | Eccles et al. | 307/252 L |
| 3,968,397 | 7/1976 | Frese et al. | 307/311 |
| 4,489,372 | 12/1984 | Hatano et al. | 363/54 |

FOREIGN PATENT DOCUMENTS

| | | |
|---|---|---|
| 0088411 | 9/1983 | European Pat. Off. |
| 2514528 | 10/1976 | Fed. Rep. of Germany. |
| 1269502 | 4/1972 | United Kingdom ............ 307/252 L |

OTHER PUBLICATIONS

"A High-Voltage, High-Powered Light-Triggered Thyristor"-K. Niwayama et al., International Conference on Power Electronics and Variable Speed Devices (*IEEE*, 1984).

"Development of HVDC Thyristor Valve Insulated and Cooled by Compressed SF$_6$ Gas",-S. Matsumura et al., *IEEE*, 1983.

"Gas Insulated HVDC Converter Stations"-Fischer et al., World Electrotechnical Congress, Moscow, U.S.S.R., Jun. 21-25, 1977.

Primary Examiner—William H. Beha, Jr.
Attorney, Agent, or Firm—Bernard, Rothwell & Brown

[57] ABSTRACT

A high-voltage thristor converter and control therefor includes a plurality of thyristor modules and a transducer for feeding a control signal to each of the thyristor modules in response to an external operation command. The transducer produces an electrical control signal which is directed to a laser beam irradiator which converts the control signal into a laser beam signal. The laser beam signal is directed to a light sensitive element in the thyristor module for converting the laser beam signal into an electric control signal to trigger a thyristor element in the module.

4 Claims, 12 Drawing Figures

HIGH-VOLTAGE THYRISTOR CONVERTER AND LASER WITH MIRROR CONTROL THEREFOR

This is a division of application Ser. No. 663,402 filed Oct. 22, 1984 now abandoned.

BACKGROUND OF THE INVENTION

1. Field:

The present invention relates to a high-voltage thyristor converter for use in DC power transmission or the like.

2. Prior Art:

FIG. 1 is a connection diagram of a high-voltage thyristor converter to which the present invention is to be applied, wherein an alternating current supplied from AC buses R, S and T is converted into a direct current via bridge-connected valves U-Z or a direct current from DC buses P and N is converted into an alternating current.

Each of the valves U-Z constituting the high-voltage converter is assembled as illustrated in FIG. 3 by superposing a desired number of thyristor modules SM on one another by the use of insulator pillars B, each thyristor module SM comprising, as illustrated in FIG. 2, a plurality of thyristor elements Sl-Sn and accessory components such as an anode reactor AL, resistors and capacitors.

In transferring a gate signal to individual thyristor elements constituting a thyristor module SM, there is known a mode which transfers to a high-voltage section an electric signal converted by means of a pulse transformer at a ground potential, and a mode which converts an operation command into a light signal by a transducer at a ground potential and then transfers the light signal to a high-voltage section via a light guide LG such as an optical cable as illustrated in the example of FIG. 3.

FIG. 4 shows the principle of a gate signal transfer system employing optical cables, wherein a transducer 1 for converting a thyristor-valve operation command into a light signal is equipped internally with light emitting elements EL. There are also shown a light guide LG composed normally of an optical cable and serving to transfer the output signal of the light emitting element EL to a thyristor module SM at a high voltage level; a joint JT disposed between the thyristor module SM and the light guide LG and so formed as to be detachable by the use of a coupler; and a light sensitive element LE for converting an input into an electric signal which serves as a trigger signal to drive a thyristor ET.

Meanwhile, due to the service life of electric circuit components constituting the thyristor module SM, it is necessary to replace each thyristor module with a new one after the lapse of a predetermined term. In such replacement where a joint JT needs to be attached to or detached from the thyristor module SM for connection of the cable to transfer electric or light signal, it has been unavoidable that some damage is caused to the light guide LG. Particularly the optical cable for transfer of light signal has a relatively low flexibility and is therefore prone to be broken during the work of replacement. Furthermore, in an UHV-class thyristor valve employed in a 500 kV DC transmission system, the withstand voltage characteristic of the optical cable is inferior to that of an epoxy cast product or the like, so that some proper improvement has been required in this aspect as well.

SUMMARY OF THE INVENTION

It is the object of the present invention to provide a novel thyristor converter which performs signal transfer in a non-contact mode between thyristor modules disposed in a high-voltage section and a signal transducer located in a ground potential section, so as to realize enhanced operational reliability and facilitated maintenance.

An exemplary thyristor converter embodying the present invention comprises a plurality of thyristor modules, a transducer for producing control signals to control the thyristor modules individually, and a plurality of laser beam irradiators for converting the output electric signal of the transducer into laser beam signals, wherein each of the thyristor modules consists of a light sensitive element for converting the output signal of the associated laser beam irradiator into an electric signal, and a converter circuit for converting the electric signal of the light sensitive element into a thyristor trigger signal.

In the above thyristor converter of this invention, a medium used for transferring a control signal to each thyristor module is a laser beam which requires none of particular transfer means such as an electric wire or optical fiber. Consequently, the thyristor module and the transducer are released from mechanical connection.

In another exemplary embodiment of the invention, a single laser beam irradiator is employed for plural thyristor modules, and a single laser beam emitted from the irradiator is distributed to the individual thyristor modules by the use of half mirrors.

DETAILED DESCRIPTION OF THE PREFERRED EMBODIMENTS

Figure 1:
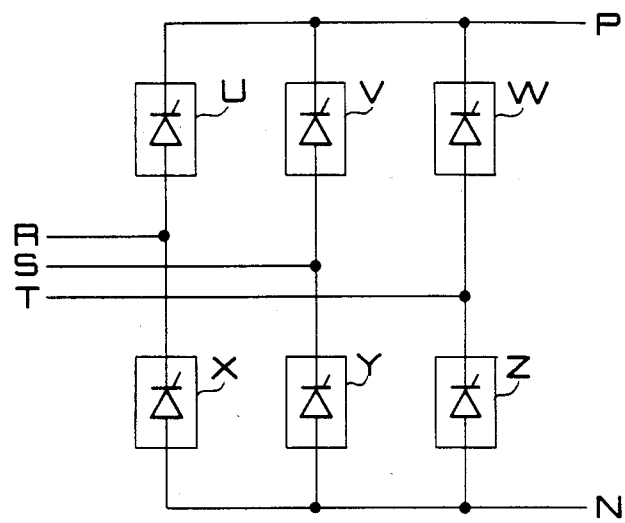
FIG. 1 an electrical connection diagram of a high-voltage thyristor converter to which the present invention is to be applied.
Figure 2:
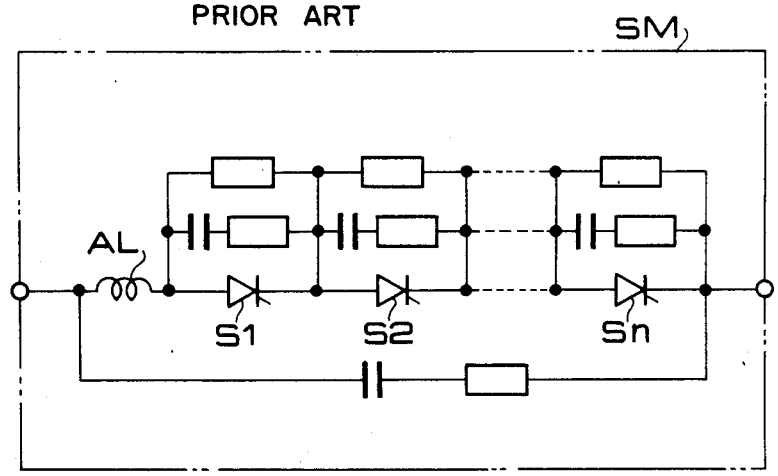
FIG. 2 is a circuit diagram of a thyristor module employed in the converter of FIG. 1.
Figure 3:
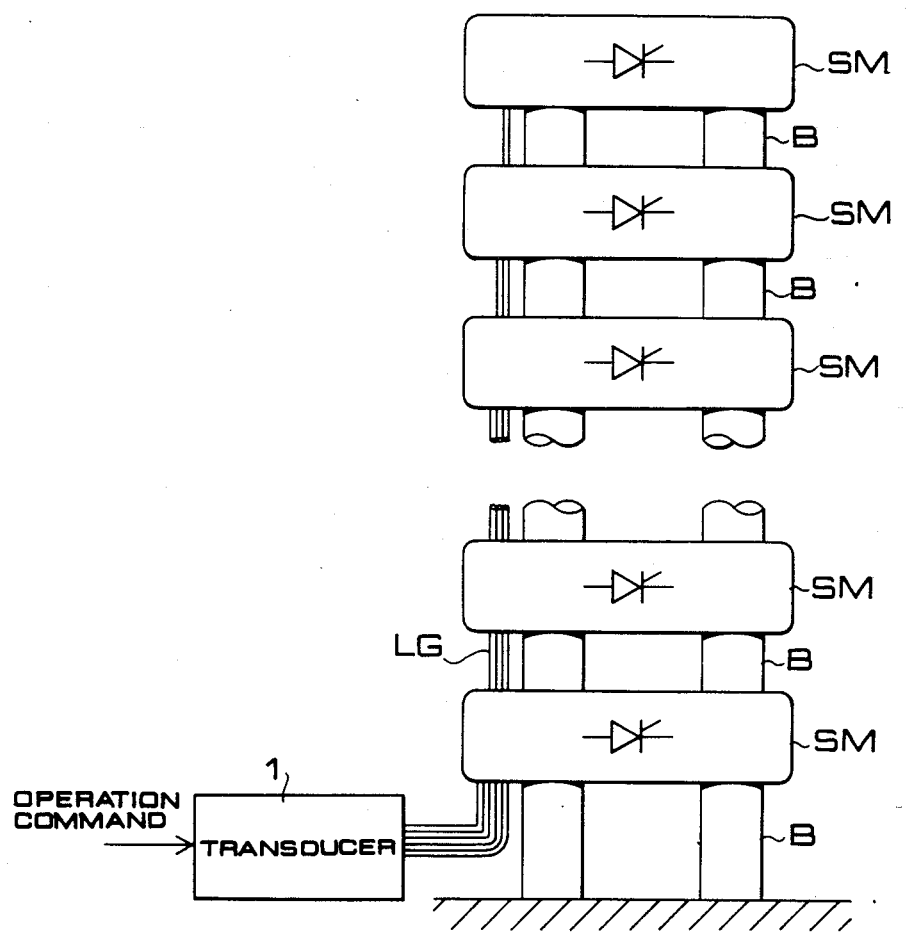
FIG. 3 is a side view schematically showing a conventional high-voltage thyristor converter.
Figure 4:
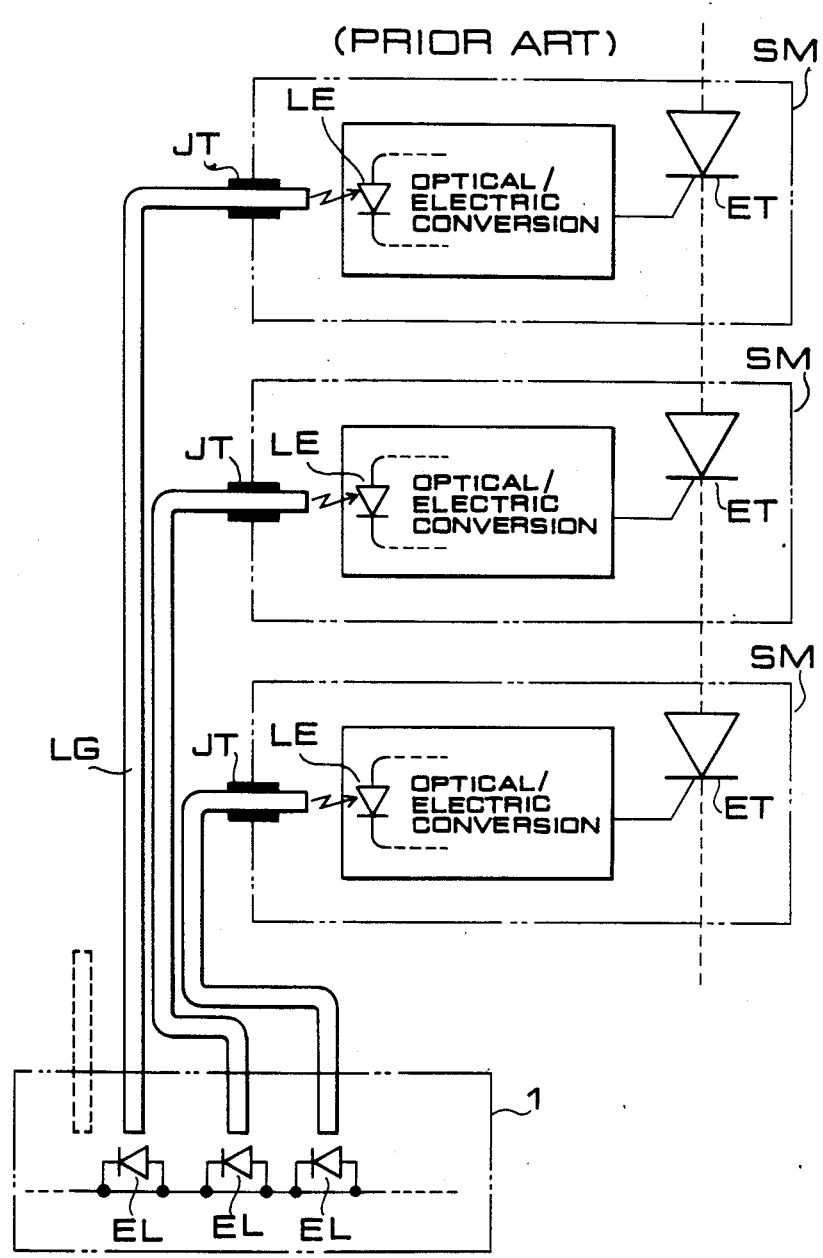
FIG. 4 is a block diagram of means for transfer of firing signals in the converter of FIG. 3.
Figure 5:
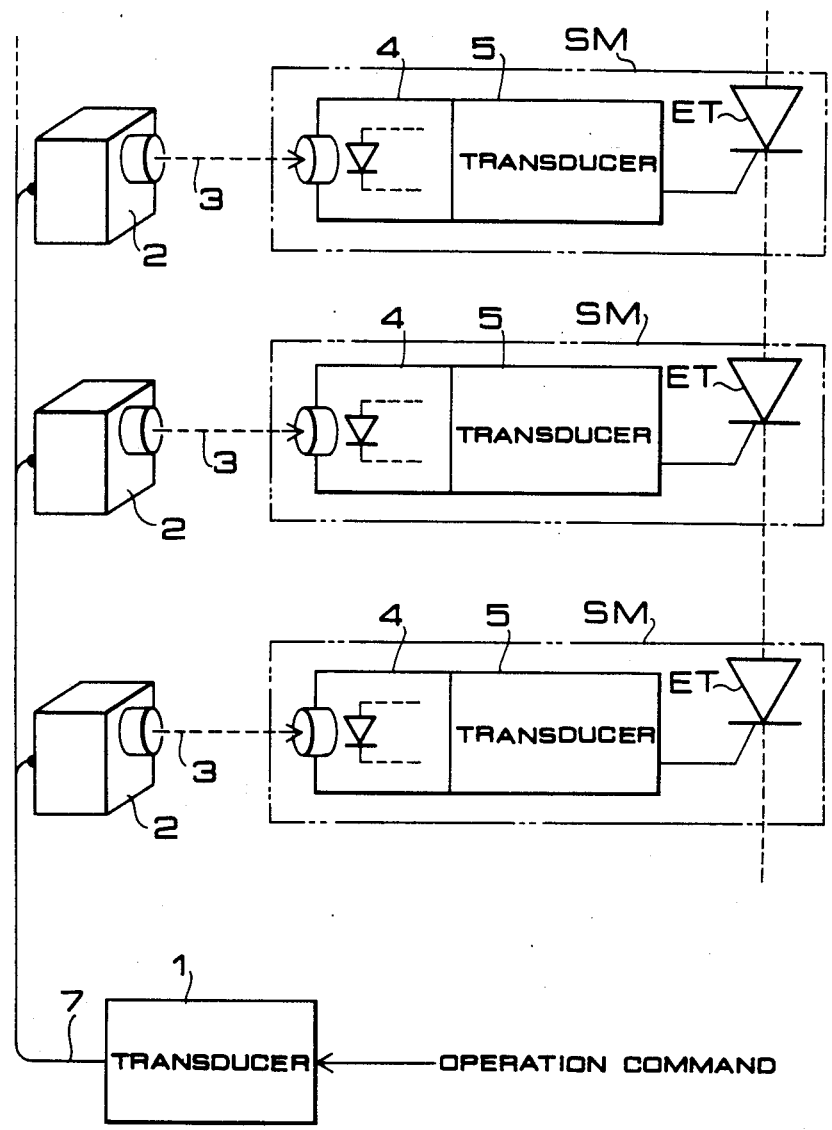
FIG. 5 is a block diagram illustrating the principle of firing signal transfer in an exemplary high-voltage thyristor converter embodying the invention.

Hereinafter an exemplary embodiment of the present invention will be described with reference to the accompanying drawings. FIG. 5 illustrates the principle of the invention, wherein a transducer 1 converts a thyristor valve operation command into an electric signal which is capable of controlling a pulsed laser beam signal 3 outputted from a laser beam irradiator 2. It is desired that the laser beam irradiator 2 be of a small output type in a dimensionally compact structure so as to be handled with facility. A preferred example is a helium-neon laser or a semiconductor laser whose output is in a visible light region of short wavelengths. (The output of a helium-neon laser has a wavelength of 6328 angstroms and an intensity on the order of 1 to 10 watts.) A laser suitable for the purpose is a helium-neon laser marketed by Spectra-Physics Internatioinal of San Jose, California, under the designations Models 155A, 157 and 159.

A light sensitive element 4 is incorporated in a thyristor module SM disposed in a high-voltage section. A photodiode or the like may be employed to serve as the light sensitive element 4. And a converter circuit 5 is provided for converting the electric output of the light sensitive element 4 into a trigger signal to drive an electrically triggered thyristor ET.

Both the laser beam irradiator 2 and the transducer 1 are placed at a ground potential and are operated while being kept out of contact with the high-voltage section where the thyristor module SM and so forth are located.

Since the helium-neon laser or semiconductor laser is a device that emits an output within a visible light region of short wavelengths, it is capable of responding to a high-frequency input signal of several kilohertz as well and is therefore suited for transfer of a thyristor control signal.

Figure 6:
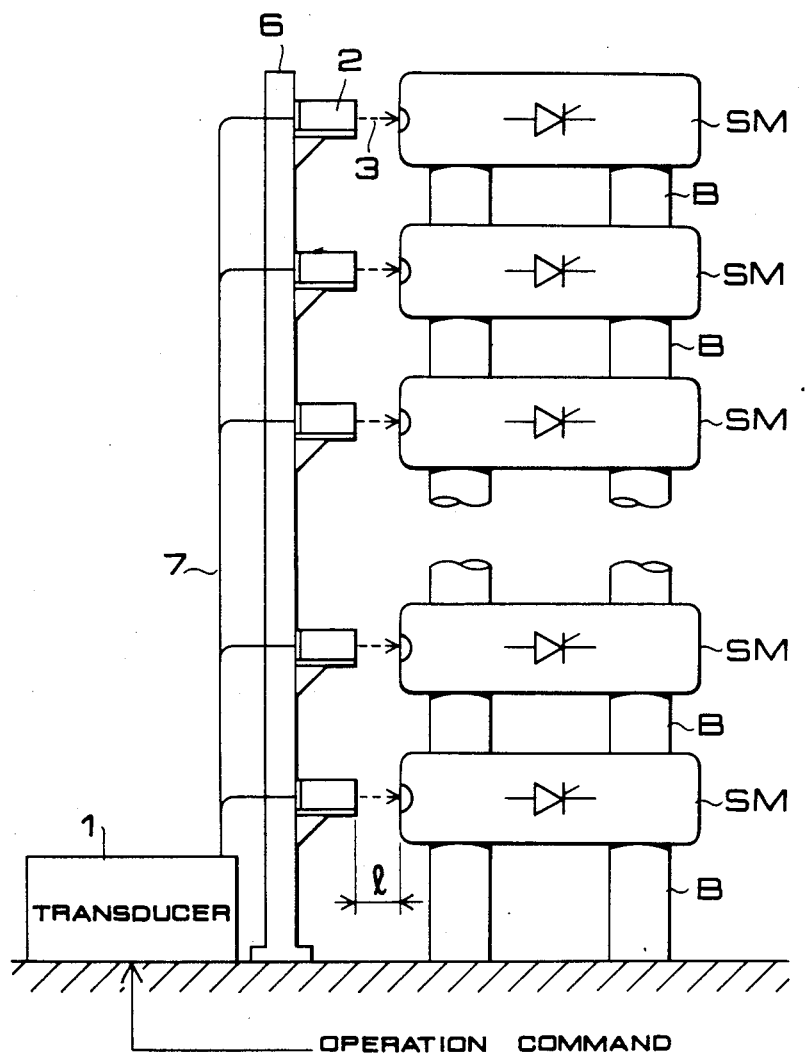
FIGS. 6 and 7 are schematic side views of the high-voltage thyristor converter based on the principle of FIG. 5.

FIG. 6 shows an exemplary embodiment of the present invention applied to an aerial insulation type high-voltage thyristor converter, wherein laser beam irradiators 2 are retained by means of a support pillar 6. A control signal for a laser beam 3 outputted from a transducer 1 in response to an operation command is transferred to each laser beam irradiator 2 through a cable 7. The insulation distance l between the thyristor module SM in a high-voltage section and the laser beam irradiator 2 can be selectively established at a desired value in accordance with the rated voltage of the thyristor converter. It is possible in this embodiment to disassemble the thyristor module SM without detaching the cable through which a thyristor firing signal is transmitted.

Figure 7:
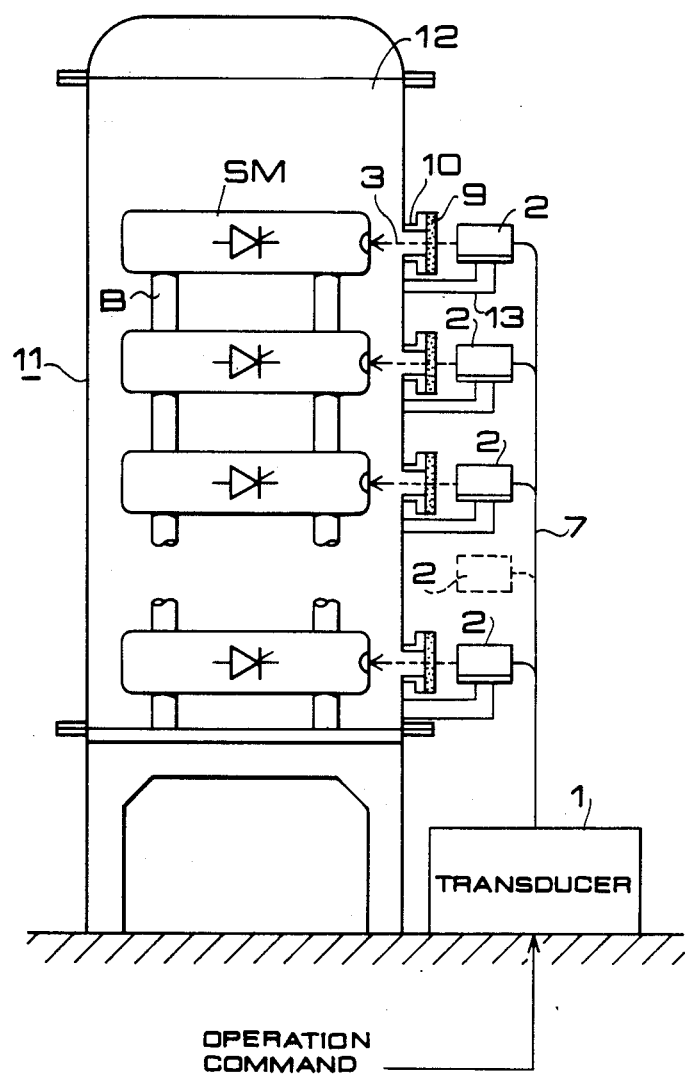

FIG. 7 shows another embodiment of the invention, wherein a metallic enclosure 11 is provided at a ground potential for housing thyristor modules SM, insulator pillars B and so forth. The enclosure 11 serves to protect the thyristor modules and the insulator pillars by isolating them from moisture and extraneous substances suspended in the ambient atmosphere. There are also shown branch pipes 10 projecting from a lateral wall of the enclosure 11 and sealed at fore ends thereof with cover plates 9 which are composed of a material suited for transmission of a laser beam therethrough. Brackets 13 are provided for mechanically supporting the laser beam irradiators 2 while maintaining a proper positional relationship thereof to the enclosure 11. A control signal for the laser beam 3 outputted from the transducer 1 in response to an operation command is transferred to the laser beam irradiator 2 via the cable 7.

In this embodiment, the necessity of a sealing device is eliminated at an enclosure portion where a signal transfer cable is introduced into the enclosure 11 according to the prior art, hence enhancing the sealing capability of the enclosure. Furthermore, due to the advantage that the control system including the transducer 1 and the laser beam irradiators 2 at the ground potential is located outside of the enclosure, it becomes possible to ensure facilitated maintenance and inspection thereof.

Although the entire thyristors used in the foregoing embodiment are of an electrically triggered type, employment of optically triggered thyristors developed lately for practical application can omit the light sensitive elements 4 and the converter circuits 5 incorporated in the thyristor modules.

Figure 8:
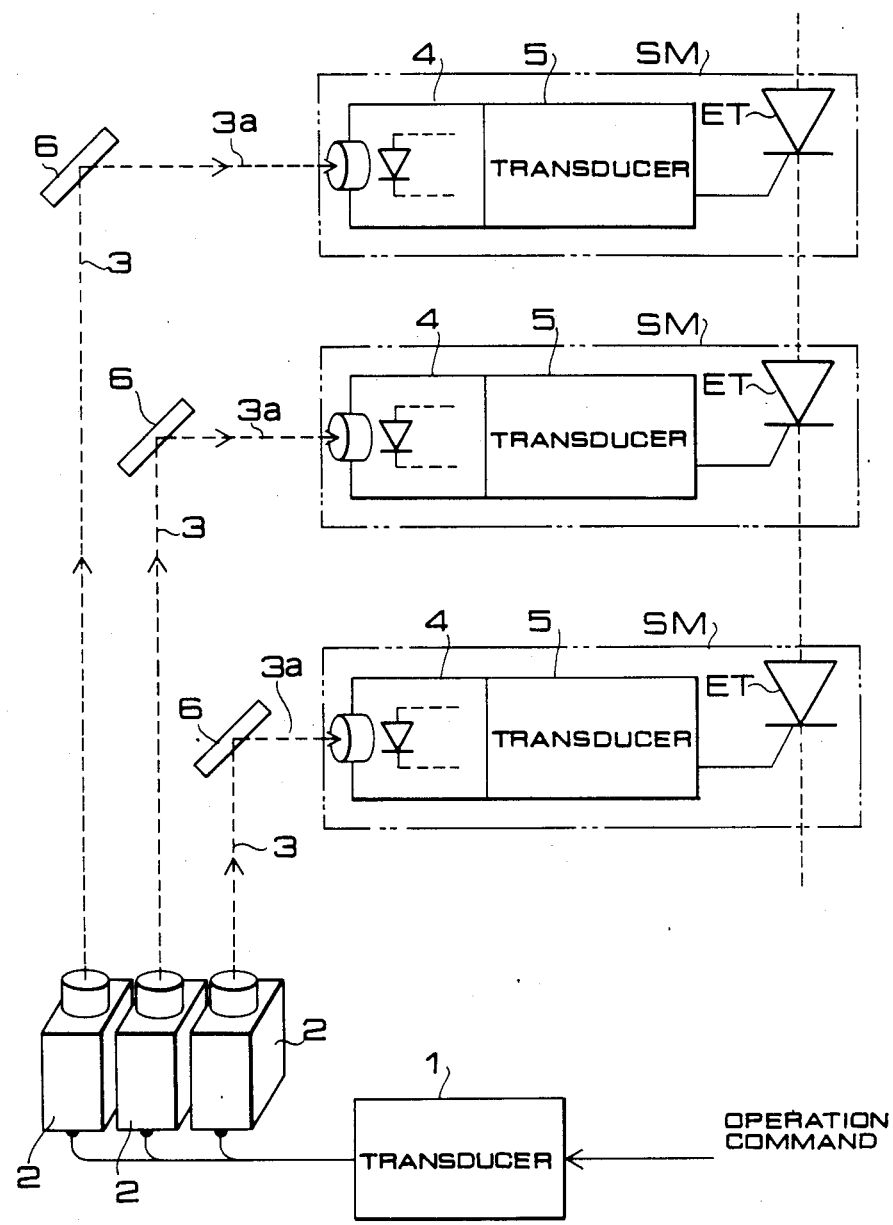
FIG. 8 is a block diagram illustrating the principle of firing signal transfer in another exemplary high-voltage thyristor converter embodying the invention.

FIG. 8 shows the principle of a further exemplary thyristor converter embodying the present invention, wherein a transducer 1, laser beam irradiators 2 and thyristor modules SM are substantially equal in both structure and function to those shown previously in FIG. 5. In this embodiment, laser beam irradiators 2 are disposed at proper positions, preferably in the vicinity of the transducer 1, in such a manner as to form mutually parallel paths of laser beam signals 3, and mirrors 6 are located in such paths of the laser beam signals 3 respectively. The optical axis of a light sensitive element 4 in each thyristor module SM is substantially orthogonal to the path of each laser beam signal 3, and the mirrors 6 are disposed at the intersections thereof individually. The direction of each mirror 6 is selectively determined for reflecting the output signal 3 of the associated laser beam irradiator 2 toward the light sensitive element 4 in the associated thyristor module SM. The laser beam signal 3 from each irradiator 2 is directionally altered through reflection at the mirror 6 located in the beam travel path and then advances along the path 3a to be incident upon the light sensitive element 4 in the associated thyristor module SM.

It is preferred that the laser beam irradiators 2, mirrors 3 and thyristor module SM be directionally adjustable so that any slight error in the positional relationship among them can be absorbed.

Figure 9:
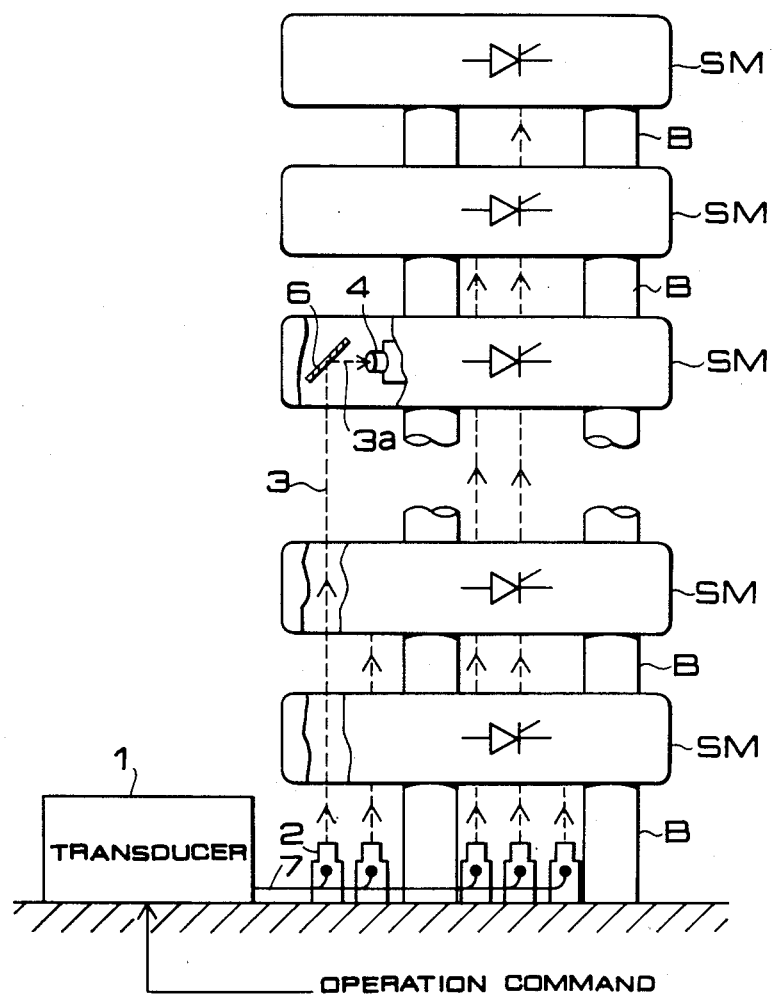
FIGS. 9 and 10 are schematic side views of the high-voltage thyristor converter based on the principle of FIG. 8.

FIG. 9 shows an aerial insulation type high-voltage thyristor converter based on the principle of FIG. 8, wherein a required number of laser beam irradiators 2 are disposed in the vicinities of a leg area of the thyristor converter. A control signal for a laser beam 3 outputted from a transducer 1 in response to an operation command is transferred to each laser beam irradiator 2 via a cable 7. The laser beams 3 from the irradiators 2 are directionally altered to advance along light paths 3a by reflecting mirrors 6 which are located in individual thyristor modules SM and are adjustable with respect to the angles of attachment thereof. Subsequently, each laser beam is converted into an electric signal by the light sensitive element 4 provided substantially horizontally in each thyristor module SM, thereby controlling the thyristor in the module.

In such arrangement where the entire laser beam irradiators 2 are located in the vicinity of the floor, maintenance and inspection are facilitated for the laser beam irradiators 2. Since the uppermost one of the superposed thyristor modules SM generally has the highest potential, in case the laser beam irradiators at the ground potential are disposed in horizontal lateral portions of the individual thyristor modules SM, it is necessary to vary the insulation distance between each laser beam irradiator and the associated thyristor module SM in such a manner that the distance becomes maximum in the uppermost stage. However, according to the present invention, the requisite to be taken into consideration is merely the insulation distance between the lowermost thyristor module and the laser beam irradiator, whereby the space required for installation of the laser beam irradiators can be minimized.

Any deviation of each beam travel path induced during assembly or replacement can be finely corrected by directionally adjusting the associated reflecting mirror 6, thereby absorbing any positional error of each module caused in the assembling step.

Figure 10:
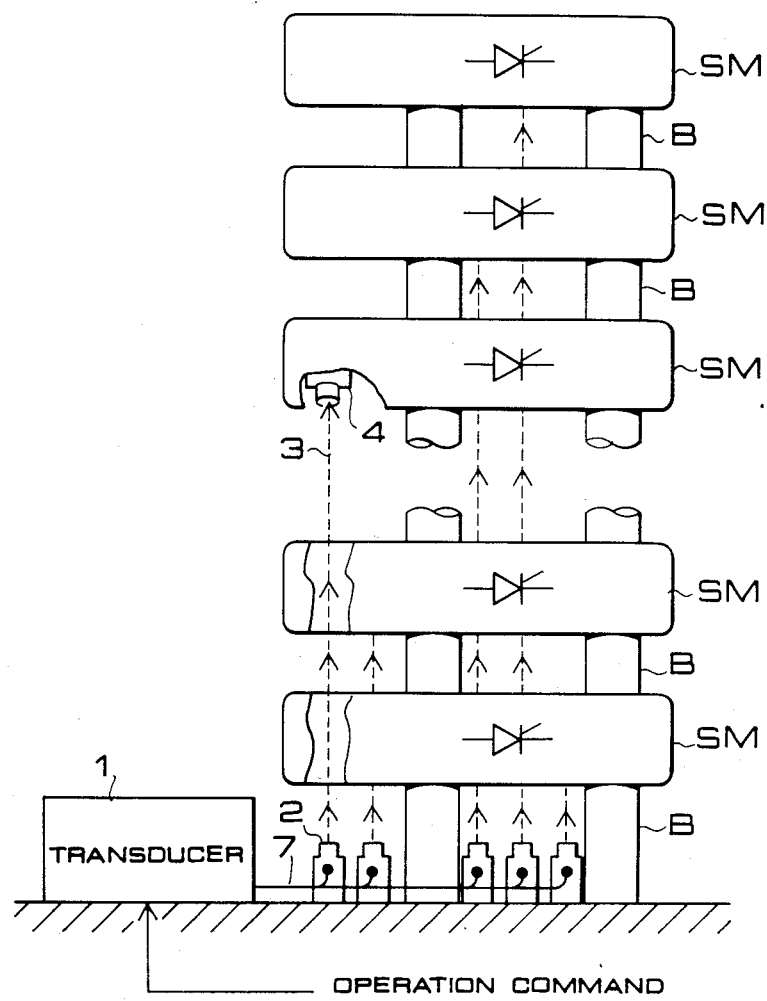

FIG. 10 shows a further exemplary embodiment of the invention, wherein light sensitive elements 4 are disposed substantially vertically in individual thyristor modules SM so that laser beam signals are transferred without the necessity of reflecting mirrors. In such arrangement, although there exists a disadvantage that adjustment of the positional relationship between the laser beam irradiator 2 and the light sensitive element 4 is rendered slightly difficult, an advantage is also attainable on the other hand that, due to elimination of reflecting mirrors, contamination of the mirror surfaces induced by dust collection effect under a DC electric field can be averted to eventually facilitate maintenance.

Figure 11:
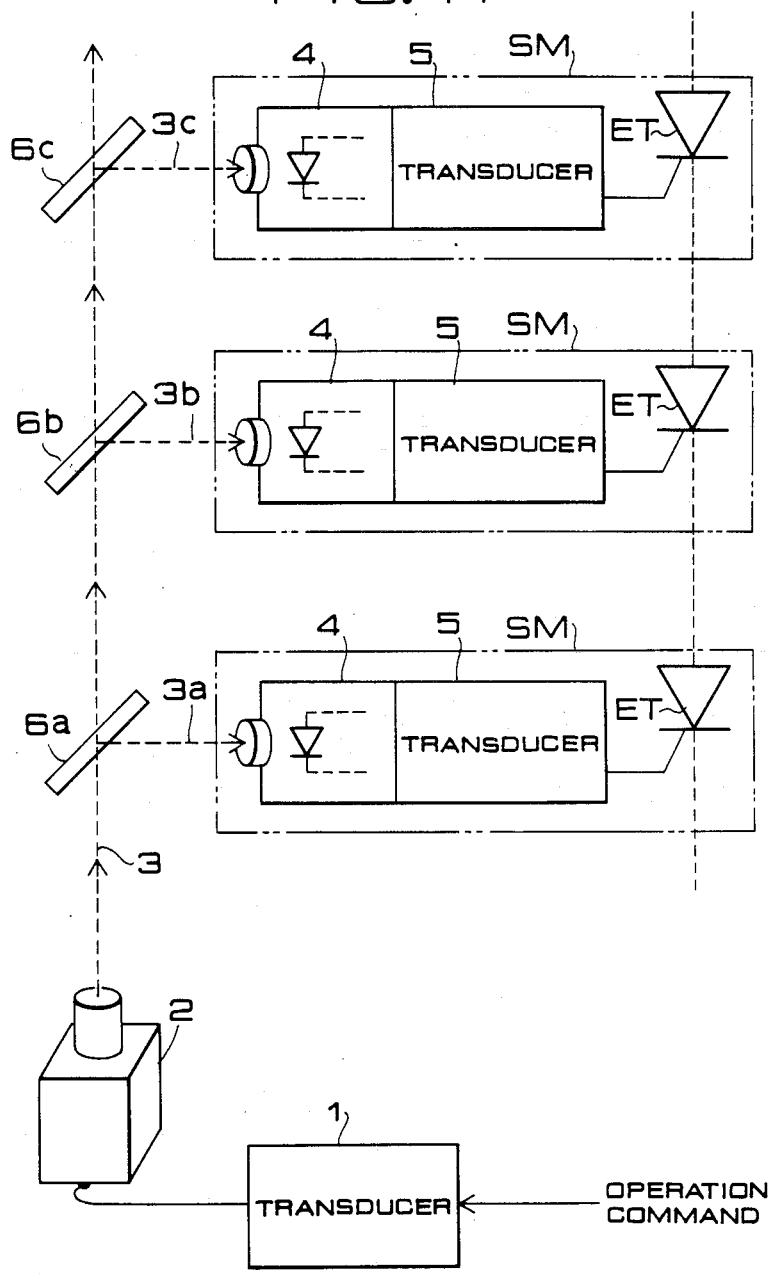
FIG. 11 is a block diagram illustrating the principle of firing signal transfer in a further exemplary high-voltage thyristor converter embodying the invention.

FIG. 11 shows still another embodiment of the invention equipped with a single laser beam irradiator 2 which is so disposed as to form a travel path of a laser beam signal 3 intersecting the optical axes of light sensitive elements 4 in a plurality of thyristor modules SM. And half mirrors 6a, 6b and 6c are disposed at individual intersections of the beam signal path and the optical axes of the light sensitive elements 4. The half mirrors 6a, 6b and 6c have such properties as to partially reflect the energy of the laser beam signal 3 emitted from the irradiator 2 while permitting transmission of the remaining energy therethrough. The laser beam signals reflected respectively at the half mirrors 6a, 6b and 6c are introduced via the individual paths 3a, 3b and 3c to the light sensitive elements 4 in the associated thyristor modules SM.

The ratio of the reflected light to the incident light is expressed as $(1-\gamma)$ in which $\gamma$ represents the light transmissivity of the half mirrors 6a, 6b and 6c. When n pieces of half mirrors are employed in total, the ratio $\beta i$ of the reflected light and the ratio $\beta i$ of the transmitted light to the initial output light of the i-th mirror are given by the following equations:

$$\alpha i = \gamma^{i-1} \cdot (1 - \gamma)$$

$$\beta i = \gamma^i$$

Therefore, by the use of half mirrors whose transmissivity $\gamma$ is approximately 1, it becomes possible to retain within a relatively narrow range the amount of the light reflected from each half mirror.

For example, when the mirrors have a transmissivity of 0.9, the ratio between the reflected light $\alpha 1$ from the first mirror and the reflected light $\alpha 8$ from the eighth mirror is $$(\alpha 8 / \alpha 1) = 0.48$$

Thus, there exists an advantage that selection of a proper transmissivity can eliminate the necessity of rendering the light sensitive elements 4 individually different for the thyristor modules SM respectively. If the transmissivities of the half mirrors are so established as to become gradually lower as the mirrors recede from a laser beam source, the amounts of the laser beams reflected from the half mirrors are rendered substantially equal to one another, whereby the same advantageous effect as the foregoing is also achievable.

Figure 12:
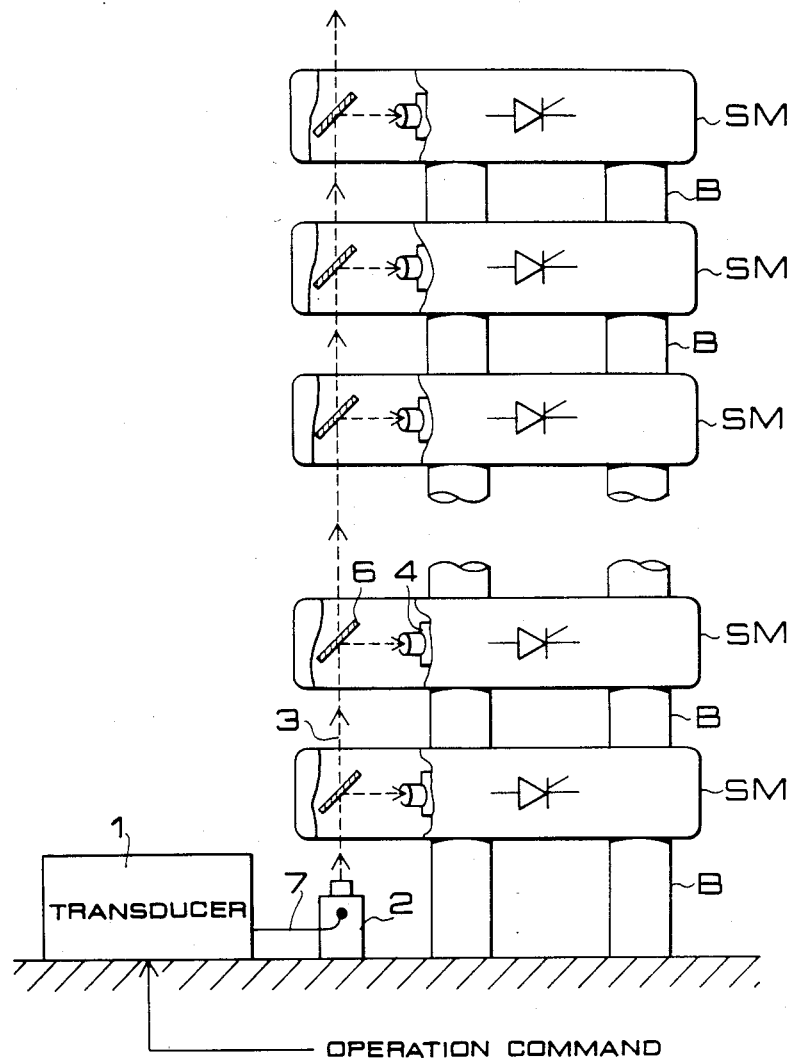
FIG. 12 is a side view schematically showing the high-voltage thyristor converter based on the principle of FIG. 11.

FIG. 12 shows an exemplary aerial insulation type high-voltage thyristor converter based on the principle of FIG. 11. In this example, a laser beam irradiator 2 is disposed in the vicinity of a leg area of the high-voltage thyristor converter. A control signal for a laser beam 3 outputted from a transducer 1 in response to an operation command is transferred via a cable 7 to the laser beam irradiator 2. The laser beam 3 from the irradiator 2 is reflected at half mirrors 6 which are located respectively in thyristor modules SM and are adjustable with respect to the angles of attachment thereof, so as to be distributed to the individual thyristor modules. The laser beams thus distributed are then converted into electric signals by light sensitive elements 4 provided substantially horizontally in the thyristor modules SM, thereby controlling the thyristors in the modules.

In such arrangement where the entire laser beam irradiators 2 are located in the vicinities of the floor, maintenance and inspection are facilitated for the laser beam irradiators. Furthermore, due to the structure that distributes the laser beam obtained from a single irradiator, the total number of irradiators to be installed is minimizable to eventually reduce the production cost as well as to enhance the operational reliability.

In addition, directional adjustment of the half mirrors 6 enables fine correction of any deviation of the beam travel path induced during assembly or replacement, whereby the positional error of the module caused in the assembling step is absorbable.

What is claimed is:

1. A high-voltage thyristor converter and control therefor comprising:
    (a) a plurality of thyristor modules including a plurality of thyristor elements and accesory electric components connected thereto;
    (b) a transducer disposed in a ground potential section and producing, in response to an external operation command, an electric control signal for driving said thyristor modules;
    (c) at least one laser beam irradiator for converting the electric control signal of said transducer into at least one laser beam signal;
    (d) each of said thyristor modules further including a light sensitive element for converting the laser beam signal into an electric control signal and a converter circuit for converting the control signal of said light sensitive element into a trigger signal adapted for triggering said thyristor elements; and
    (e) a metallic sealing enclosure disposed at the ground potential for housing said thyristor modules therein, said enclosure having windows to introduce therethrough the laser beam signals to said light sensitive elements in the associated thyristor modules; and
    (f) mirrors disposed in line with said windows for introducing the laser beam signals individually from said irradiator to said light sensitive elements in the associated thyristor modules.

2. The thyristor converter and control therefor as defined in claim 1, wherein said mirrors are directionally adjustable.

3. The thyristor converter and control therefor as defined in claim 4 wherein said mirrors are half mirrors for reflecting the laser beam signal from said irradiator and thereby directing said signal towards said thyristor modules.

4. The thyristor converter central therefor as defined in claim 3, wherein said half mirrors are disposed sequentially along the travel path of the laser beam signal emitted from said irradiator in such a manner as to have different transmissivities which become sequentially lower in accordance with increase of the distance from said laser beam irradiator.

* * * * *

UNITED STATES PATENT AND TRADEMARK OFFICE
CERTIFICATE OF CORRECTION

PATENT NO. : 4,700,284
DATED : October 13, 1987
INVENTOR(S) : Toshiaki Yoshizumi and Akiyoshi Yoshioka It is certified that error appears in the above-identified patent and that said Letters Patent is hereby corrected as shown below:

Column 5, line 36, "rndividual" should be --individual--;

line 50, "$\not{p}$i" should be --$\delta$i--.

Signed and Sealed this

Seventeenth Day of May, 1988

Attest:

DONALD J. QUIGG

Attesting Officer

Commissioner of Patents and Trademarks